May 16, 1967 R. H. BAER 3,320,604
INDICATOR ANNOUNCING SYSTEM
Filed Feb. 10, 1965 3 Sheets-Sheet 1

INVENTOR
RALPH H. BAER
BY
ATTORNEY

May 16, 1967  R. H. BAER  3,320,604
INDICATOR ANNOUNCING SYSTEM
Filed Feb. 10, 1965  3 Sheets-Sheet 2

INVENTOR
RALPH H. BAER
BY
ATTORNEY

May 16, 1967  R. H. BAER  3,320,604
INDICATOR ANNOUNCING SYSTEM
Filed Feb. 10, 1965

INVENTOR
RALPH H. BAER

United States Patent Office 3,320,604
Patented May 16, 1967

3,320,604
INDICATOR ANNOUNCING SYSTEM
Ralph H. Baer, Manchester, N.H., assignor to Sanders Associates, Inc., Nashua, N.H., a corporation of Delaware
Filed Feb. 10, 1965, Ser. No. 431,533
18 Claims. (Cl. 340—266)

This invention relates to indicator systems and more particularly to indicator announcing systems.

The use of indicators for the monitoring of diverse systems is a fairly common practice, as is well known to those skilled in the art. Generally, the indicator is associated with a meter and requires a visual observation thereof to ascertain the meter indication or reading. However, in cases where the observer's attention is also focused on other things, either deliberately or accidentally, such schemes may be highly undesirable. One such case, for example, occurs during the landing of an aircraft, wherein the pilot is, inter alia, simultaneously making visual observations of the traffic pattern, approaching runway, aircraft instruments, and is in radio communication with the airfield's tower. Under these conditions, it is extremely difficult for the pilot to monitor visually, for example, his altimeter with any degree of consistency and/or accuracy.

It is an object of this invention to provide an indicator system which allows aural monitoring by the observer.

Another object of this invention is to provide an indicator system which is capable of being utilized with apparatus of existing indicator systems with minimum or negligible modification of the latter.

Still another object of this invention is to provide an aural indicator system that can be applied to any conventional meters utilizing pointers.

A fourth object is to provide an aural indicator system which automatically provides analog to digital conversion.

The present invention features, inter alia, a meter means which has an associated movable indicator. A light beam is provided by a light source and the position of the light beam is changed by suitable means in proportion to the movement or displacement of the indicator. At least one film sound track is provided which is optically aligned with a predetermined position of the light beam. On the film track is prerecorded the meter indication which corresponds to this position. Optical scanning means causes the track to be scanned by the light beam when the latter is in the aforesaid predetermined position. The amount of light from the beam passing through the track is detected by photoelectric transducer means which in turn provides an output signal proportional thereto or an aural indication.

Another feature of this invention is to provide in the foregoing indicator system means to convert the aforementioned output signal to an audio signal.

Still another feature of the invention is to provide for audio output at discrete intervals from an analog device.

The above-mentioned and other features and objects of this invention will become more apparent by reference to the following description taken in conjunction with the accompanying drawings, in which.

Figure 1:
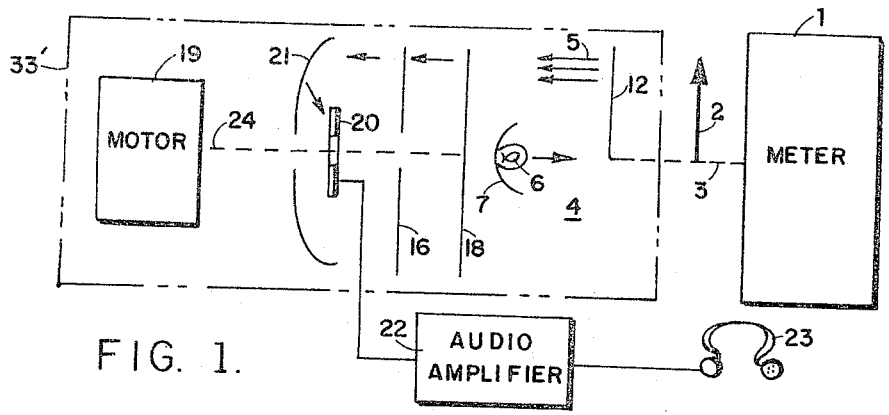
FIG. 1 is a schematic diagram, partially illustrated in block form, of an embodiment of the indicator announcing system of this invention.
Figure 2:
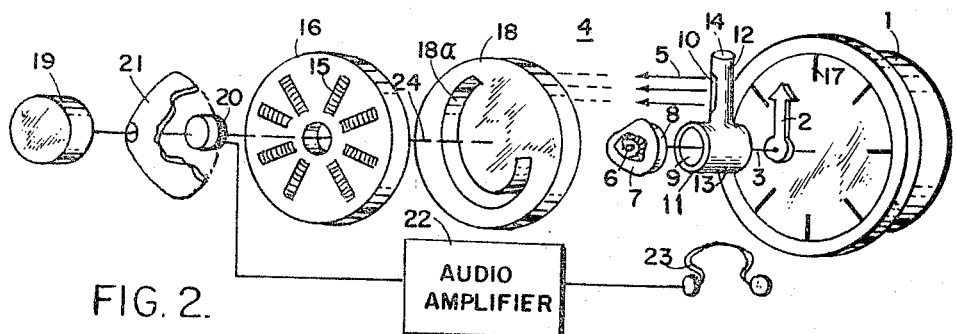
FIG. 2 is an exploded perspective view, partially illustrated in block form, showing in greater detail the embodiment of FIG. 1.

Referring now to the figures in greater detail, where like reference numbers denote like parts in the figures, and referring in particular to FIGS. 1 and 2, the meter 1 and its associated indicator 2 are chosen, by way of example only, as an aircraft altimeter and its associated pointer, respectively, to describe the principles of this invention. As is well known to those skilled in the art, the movement of pointer 2 is actuated by a suitable driver mechanism, not shown, which may be, for example, of geared Bourdon tube, D'Arsonval or servo types. For the purpose of this invention, any type of driver mechanism which actuates a pointer is suitable. The pointer is coupled to the aforementioned driver means, not shown, by the shaft 3, illustrated for purposes of clarity as a dash line.

A source of light, indicated generally by the reference numeral 4, provides a light beam 5. As illustrated in FIGS. 1 and 2, the source of light comprises the lamp 6 and an optical lens system including reflector 7, lenses 8, 9 and the elongated slit opening 10. The lens 9 is mounted in a hollow cylindrical member 11 which has a hollow protrusion 12 extending radially therefrom. The respective ends 13, 14 of the cylindrical body or member 11 and the protrusion 12 are closed or sealed and the inner walls of the body 11 and protrusion 12 are coated with a suitable reflective material so that the light beam emanates from the narrow elongated slit opening 10. The body 11 is mounted on the shaft 3 and thus the position of the light beam 5 is changed directly with the displacement of the indicator 2. As a result, each position of the light beam is associated with a particular meter indication.

A plurality of film sound tracks, such as track 15, are radially mounted on a member 16. In the embodiment of FIGS. 1 and 2, the member 16 is preferably a disk-shaped opaque body having radial longitudinal openings therein, in which the respective film sound tracks are mounted. Each of the tracks is in optical alignment with an exclusive predetermined position of the light beam. Optically prerecorded in the manner of motion picture sound track on each of the tracks is an exclusive respective meter indication associated with the predetermined position of the light beam with which the respective track is optically aligned. By way of example and for purposes of illustration, track 15 is optically aligned with the position of the light beam that corresponds to the meter indication 17, and the latter is prerecorded on track 15. The disk 16 is fixed in position within the system and does not rotate.

Optical scanning means, illustrated as comprising the optical scanner 18 and scanning motor driver 19 therefor, are provided to scan the respective track with the light beam when the latter is in the appropriate aforementioned predetermined position, i.e. in the position with which the track is optically aligned. In the embodiment of FIGS. 1 and 2, the optical scanner 18 is preferably a disk-shaped opaque body having a scanning slit 18a of a predetermined configuration such as, for example, the spiral scanning slit 18a shown in FIG. 2. In this manner, as is obvious to those skilled in the art, by the rotation of the disk 18 a track will be scanned along its longitudinal axis by the light beam after it passes through the slit 18a whenever the light beam is in the respective predetermined position with which the respective track is optically aligned.

The amount of light from the beam which passes through a scanned track is detected by a photoelectric transducer means 20 via the reflector 21. The output signal of the photoelectric transducer means 20 is in turn converted to an audio signal by a suitable audio amplifier 22, illustrated in block form in FIGS. 1 and 2, in a manner well known to those skilled in the art. The output of amplifier 22 is coupled to suitable utilization means such as a loudspeaker or headset 23 as shown in FIGS. 1 and 2 and thereby provides for aural monitoring of the movement or displacement of the indicator 2 of meter 1.

In practice, the scanning motor 19, the photoelectric transducer 20, amplifier 22, and lamp 6, as well as their associated circuit components, are coupled to suitable power supply means, not shown, for energization and/or biasing during operation. Under these conditions, the scanner 18, which is coupled to the motor shaft 24, illustrated in FIGS. 1 and 2 as a dash line for purposes of clarity, is driven by the motor 19 and lamp 6 is illuminated. The light from the lamp 6 is focused by lens system 8, 9 on the aforementioned reflective material which coats the inner walls of the cylinder 11 and its hollow protrusion 12. As a result, the light beam emanates from the opening 10 as substantially a ribbon-shaped beam and in a direction normal to the flat planar surfaces of the disk-shaped body 18. By judiciously selecting the parameters of the cross-sectional width and height of the scanning slit 18a and opening 10, the curvature of the scanning slit 18a, and the speed and direction of the scanner 18, the light beam passes through the scanning slit 18a with a given cross-sectional configuration and moves in a predetermined unilateral direction normal to the disk-shaped body 16 at a predetermined rate which is compatible with the requirements of the optical sound recording system utilized. The light beam, whenever it is in one of the aforementioned predetermined positions, scans the respective track with which it is in optical alignment, as aforementioned. As a result, the light beam passes through and is modulated by the track being scanned. In the present invention, variable density recordings are preferred for the film sound tracks, but other types such as variable area ones may be also utilized, as is obvious to those skilled in the art. The modulated light beam, after being deflected by the reflector 21, is detected by the photoelectric transducer 20. The output signal of the transducer is converted, in turn, to an audio signal by the amplifier 22. In the example herein described, the output of the amplifier 22 is coupled to the pilot's headset 23, as, for example, during landings of the aircraft, so that the pilot can aurally observe the altitude indications of the aircraft's altimeter.

Since the disk 16 has a number of discrete film strips, each of which relates to only one position of the pointer 2, while the pointer has an infinite number of positions, the invention results in a device which automatically gives direct analog to digital conversion.

Figure 3:
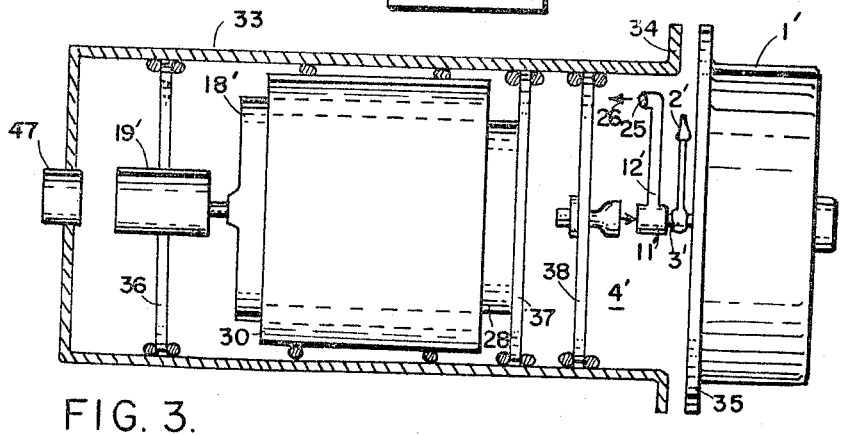
FIG. 3 is a longitudinal view, partially cut away to illustrate the components thereof, of another embodiment of this invention.
Figure 4:
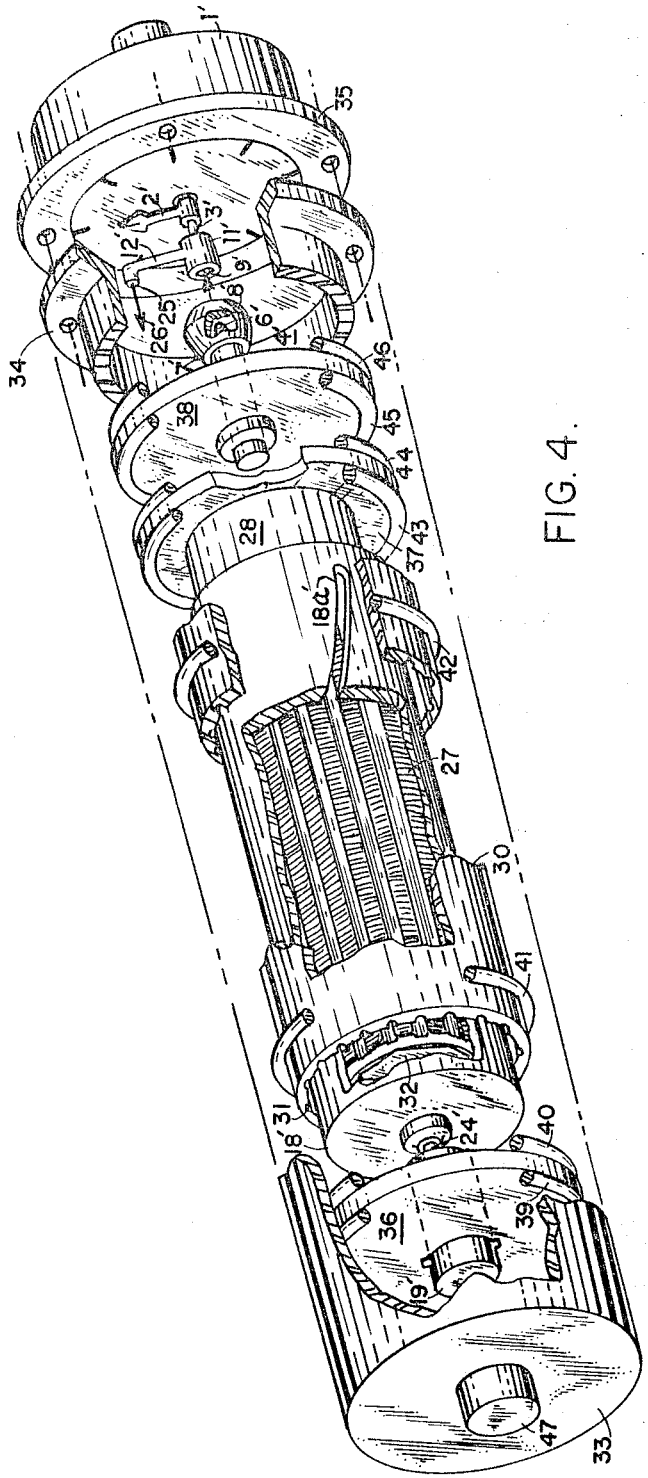
FIG. 4 is a perspective view, cut away at different parts for the sake of clarity, of the embodiment of FIG. 3.

Referring now to FIGS. 3 to 8, there is illustrated another embodiment of the present invention. Again, the meter 1' and its associated indicator 2' could be any meter utilizing a pointer, as an altimeter and its associated pointer, respectively. As illustrated in FIGS. 3 and 4, the light source, indicated generally by the reference number 4', comprises a lamp 6' and an associated optical lens system. The optical lens system as shown in FIGS. 3 and 4 comprises a reflector 7', and lenses 8', 9'. The lens 9' is mounted in a hollow cylindrical member 11' which has a hollow protrusion 12' extending radially therefrom. Mounted in the hollow protrusion 12' is a luminescent member having a configuration compatible to the inner configuration of the protrusion 12'. A tip 25 of the luminescent member extends from an opening provided in the protrusion 12'. When the lamp 6' is energized, its light rays are focused by the lens system in a manner which causes the luminescent member to be illuminated. As a result a beam 26 of light is emanated from the tip 25 of the luminescent member. The body 11' is mounted on the indicator shaft 3' and thus the position of the light beam is changed proportionally with the displacement of the indicator 2'.

Figure 5:
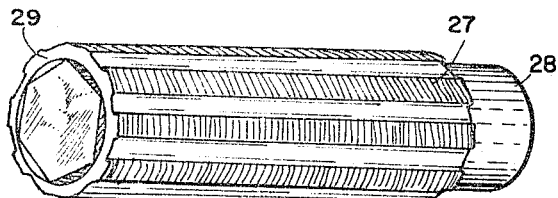
FIG. 5 is a perspective view of the film sound track member and the photoelectric transducer mounted therein of the embodiment of FIG. 3.
Figure 6:
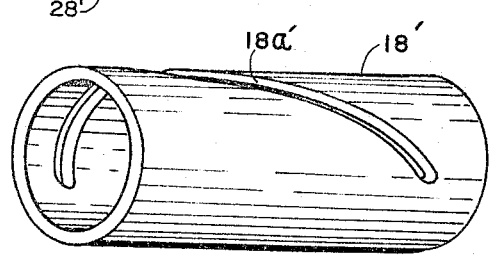
FIGS. 6 and 7 are perspective views of the optical scanner and reflector sleeve, respectively, of the embodiment of FIG. 3.

A plurality of film sound tracks, such as the track 27, is optically mounted on a hollow cylindrical body 28, cf. FIG. 5. Each of the tracks is in optical alignment with a substantially exclusive predetermined position of the light beam. Furthermore, on each of the tracks is optically prerecorded in the manner of a sound film track the respective meter indication associated with the position of the light beam with which the respective track is optically aligned. The body 28' may be fabricated by wrapping a photographic sheet 29, with the sound tracks thereon, around the hollow transparent cylindrical body 28.

Optical scanning means, comprising the optical scanner 18' and motor driver 19' therefor, scans by the light beam, in each of its aforementioned predetermined positions, the track with which it is respectively optically aligned. The optical scanner 18' comprises a hollow cylindrical opaque body which has a scanning slit 18a' illustrated in FIG. 6. The body of scanner 18' is concentrically disposed about the body 28, and is affixed to the motor shaft 24' of motor 19'. In this manner, as is obvious to those skilled in the art, a track will be scanned along its longitudinal axis by the light beam as it passes through the slit 18a' whenever the light beam emanating from the elongated slit 18a' is in the respective predetermined position with which the track is optically aligned.

Figure 7:
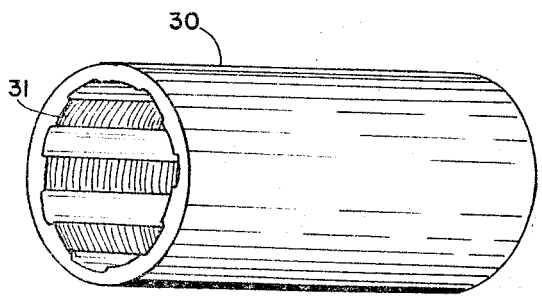
Figure 8:
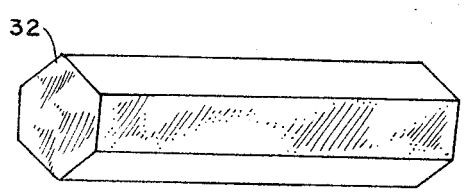
FIG. 8 is a perspective view of the photoelectric transducer of the embodiment of FIG. 3.

The light beam emanating from the tip 25 is deflected normal to the lateral surfaces of the bodies 18' and 28 by a hollow cylindrical opaque body or reflector sleeve 30, cf. FIG. 7, which is concentrically disposed about the scanner body 18'. The reflector sleeve 30 has a plurality of parallel reflector surfaces, such as surface 31, that are longitudinally disposed along the inner lateral surface of the body 30. Each of the reflector surfaces is in a substantially mutually exclusive optical alignment with a predetermined track and has a given configuration for reflecting the light beam emanated from the tip 25 normal to the lateral surfaces of bodies 18' and 28. The reflector surfaces may be fabricated by, for example, cutting longitudinal grooves along the inner lateral surface of the sleeve 30, and coating each of the grooves with a reflective material. The bottom of the grooves, for example, may be formed so they effectively act as a mirror to reflect the light on the film strips.

The amount of light from the beam which passes through the scanned track is detected by a photoelectric transducer 32. The transducer 32 is mounted within the transparent hollow cylindrical body 28, cf. FIG. 7, and is fabricated in the manner shown in FIG. 8. The output signal of the photoelectric transducer 32 is, in turn, converted to an audio signal by an amplifier, not shown, in a manner well known to those skilled in the art. The output of the last-mentioned amplifier, not shown, is coupled to suitable utilization means, not shown, such as, for example, a loudspeaker or headset. In this manner, there is provided aural monitoring of the movement or displacement of the indicator 2' of meter 1'.

As shown in FIGS. 3 and 4, the components thereof are readily adapted to be mounted and encapsulated in a housing 33 having an outwardly flanged opening 34 adapted to be coupled to the flange 35 of meter 1'. Suitable mounting disks 36–38, and/or retaining rings 39–46 maintain the respective components in proper alignment. The disks 37, 38 are made of a transparent material so as not to interfere with the passage of the light beam. An electrical connector 47 is provided for coupling the drive motor 19', lamp 6', and the photoelectric transducer 32 to a suitable power supply means, not shown, as well as the output of the photoelectric transducer to the aforementioned amplifier and audio detector network, not shown. Thus, the system of the present invention readily lends itself to utilization with presently installed apparatus of existing systems, such as in the example described herein with the meter, power supply, and headset that are generally part of today's aircraft systems.

In a similar manner, the components of the embodiment of FIG. 1, which are within the dash-dot line 33', may also be encapsulated in a suitable housing.

Figure 9:
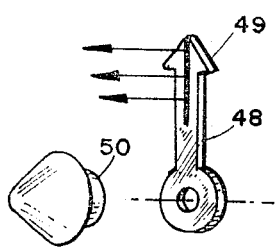
FIG. 9 is a perspective view of part of an alternative light source utilized in the present invention.

As another alternative for part of the light beam sources described herein above, the meter indicator 48 is coated with a luminescent strip, such as the strip 49, FIG. 9, and is illuminated by the lamp 50.

It is to be noted that applicant's invention can be added to conventional meters with only a slight modification or addition to their pointers.

The components of the embodiments of this invention have been described and/or illustrated with a particular configuration and are preferably disposed in a symmetrical relationship. However, it is to be understood that other modifications, as well as asymmetrical systems, are possible as contemplated by the scope of this invention and as is obvious to those skilled in the art. In addition, it is further understood that by judiciously designing the system of the present invention the use of light beam deflectors, such as, for example, the sleeve 30, cf. FIG. 7, may be eliminated, or the system of the present invention may be modified to use other and/or additional light beam deflectors in a manner which is obvious to those skilled in the art. Thus, while I have described above the principles of my invention in connection with specific apparatus, it is to be clearly understood that this description is made only by way of example and not as a limitation to the scope of my invention as set forth in the objects thereof and in the accompanying claims.

I claim:

1. An indicator announcing system comprising meter means having a movable indicator, a light source adapted to provide a light beam, means to change the position of said light beam proportional to the displacement of said indicator, at least one film sound track having prerecorded thereon a predetermined meter position of said light beam corresponding to said predetermined meter indication, means for optically scanning said track by said light beam in said predetermined position thereof, photoelectric transducer means to provide an output signal responsive to the light from said beam passing through said sound track and means for converting said output signal to an audio signal corresponding to said predetermined meter indication.

2. An indicator announcing system comprising meter means having a movable indicator, a light source adapted to provide a light beam, means to change the position of said light beam proportional to the displacement of said indicator, a plurality of film sound tracks, each of said tracks being in optical alignment with a substantially exclusive predetermined position of said light beam and having prerecorded thereon the meter indication associated with said predetermined position, means for optically scanning by said light beam in each of said predetermined positions thereof the respective track optically aligned therewith, photoelectric transducer means to provide an output signal responsive to the light from said beam passing through the track being scanned, and means for converting said output signal to an audio signal corresponding to the respective meter indication prerecorded on the track being scanned.

3. Indicator announcing apparatus comprising a meter having a movable indicator, a light source adapted to provide a light beam, means to change the position of said light beam proportional to the displacement of said indicator, a member having at least one film sound track with a predetermined meter indication prerecorded thereon, said track being optically aligned with a predetermined position of said light beam corresponding to said predetermined meter indication, an optical scanner for scanning said track by said light beam in said predetermined position thereof, photoelectric transducer circuit means to detect the amount of light from said beam passing through said track and provide an output signal responsive thereto, and further circuit means for converting said output signal to an audio signal corresponding to said predetermined meter indication.

4. Indicator announcing apparatus comprising a meter having a movable indicator, a light source adapted to provide a light beam, means to change the position of said light beam proportional to the displacement of said indicator, a member having a plurality of film sound tracks optically mounted thereon, each of said tracks being in optical alignment with a substantially exclusive predetermined position of said light beam and having prerecorded thereon the meter indication associated with said predetermined position, an optical scanner for scanning by said light beam in each of said predetermined positions thereof the respective track optically aligned therewith, photoelectric transducer circuit means to detect the amount of light from said beam passing through the track being scanned and provide an output signal responsive thereto, and further circuit means for converting said output signal to an audio signal corresponding to the predetermined meter indication prerecorded on the track being scanned.

5. Apparatus according to claim 4 wherein said member comprises a disk-shaped first body having said sound tracks radially disposed thereon, and said optical scanner comprises a rotatable disk-shaped opaque second body having an optical scanning slit with a predetermined configuration disposed therethrough and a motor to drive said second body, the direction of said light beam being substantially normal to the respective planar surfaces of said first and second bodies.

6. Apparatus according to claim 4 wherein said member comprises a hollow cylindrical first body having said sound tracks disposed longitudinally about the lateral surface thereof in a parallel relationship, and said optical scanner comprises a rotatable opaque hollow cylindrical second body having an optical scanning slit with a predetermined configuration through the lateral surface thereof and a motor to drive said second body, said second body being concentrically disposed about said first body, and the direction of said light beam being substantially normal to the respective lateral surfaces of said first and second bodies.

7. Apparatus according to claim 6 wherein said means to change the position of said light beam comprises a hollow cylindrical third body having a plurality of parallel reflective surfaces longitudinally disposed about the inner lateral surface of said third body, said third body being concentrically disposed about said second body, each of said reflective surfaces being in substantially mutually exclusive optical alignment with a predetermined track and having a given configuration for reflecting said light beam normal to the lateral surfaces of said first and second bodies.

8. In an indicator announcing system having a meter with a movable indicator associated therewith, the combination comprising a light source adapted to provide a light beam, means to change the position of said light beam proportional to the displacement of said indicator, at least one film sound track having prerecorded thereon a predetermined meter indication, said sound track being optically aligned with a predetermined position of said light beam corresponding to said predetermined meter indication, means for optically scanning said track by said light beam in said predetermined position thereof, photoelectric transducer means to detect the amount of light from said beam passing through said sound track and provide an output signal responsive thereto.

9. The combination according to claim 8 comprising further means for converting said output signal to an audio signal corresponding to said predetermined meter indication.

10. In an indicator announcing system having a meter with a movable indicator associated therewith, the combination comprising a light source adapted to provide a light beam, means to change the position of said light beam proportional to the displacement of said indicator, a plurality of film sound tracks, each of said tracks being in optical alignment with a substantially exclusive predetermined position of said light beam and having prerecorded thereon the meter indication associated with said predetermined position of said light beam, means for optically scanning by said light beam in each of said predetermined positions thereof the respective track optically aligned therewith, and photoelectric transducer means to detect the amount of light from said beam passing through the track being scanned thereby and provide an output signal in response thereto.

11. The combination according to claim 10 comprising further means for converting said output signal to an audio signal corresponding to the respective meter indication prerecorded on the track being scanned.

12. In indicator announcing apparatus having a meter with a movable indicator associated therewith, the combination comprising a light source adapted to provide a light beam, means to change the position of said light beam proportional to the displacement of said indicator, a member having at least one film sound track with a predetermined meter indication prerecorded thereon, said track being optically aligned with a predetermined position of said light beam corresponding to said predetermined meter indication, an optical scanner for scanning said track by said light beam in said predetermined position thereof, and photoelectric transducer circuit means to detect the amount of light from said beam passing through said track and provide an output signal responsive thereto.

13. The combination according to claim 12 comprising further circuit means for converting said output signal to an audio signal corresponding to said predetermined meter indication.

14. In indicator announcing apparatus having a meter with movable indicator associated therewith, the combination comprising a light source adapted to provide a light beam, means to change the position of said light beam proportional to the displacement of said indicator, a member having a plurality of film sound tracks optically mounted thereon, each of said tracks being in optical alignment with a substantially exclusive predetermined position of said light beam and having prerecorded thereon the meter indication associated with said predetermined position, an optical scanner for scanning by said light beam in each of said predetermined positions thereof the respective track optically aligned therewith, and photoelectric transducer circuit means to detect the amount of light from said beam passing through the track being scanned and provide an output signal responsive thereto.

15. The combination according to claim 14 comprising further circuit means for converting said output signal to an audio signal corresponding to the predetermined meter indication prerecorded on the track being scanned.

16. The combination according to claim 14 wherein said member comprises a disk-shaped first body having said sound tracks radially disposed thereon, and said optical scanner comprises a rotatable disk-shaped opaque second body having an optical scanning slit with a predetermined configuration disposed therethrough and a motor to drive said second body, the direction of said light beam being substantially normal to the respective planar surfaces of said first and second bodies.

17. The combination according to claim 14 wherein said member comprises a hollow cylindrical first body having said sound tracks disposed longitudinally about the lateral surface thereof in a parallel relationship, and said optical scanner comprises a rotatable opaque hollow cylindrical second body having an optical scanning slit with a predetermined configuration through the lateral surface thereof and a motor to drive said second body, said second body being concentrically disposed about said first body, and the direction of said light beam being substantially normal to the respective lateral surfaces of said first and second bodies.

18. The combination according to claim 17 wherein said means to change the position of said light beam comprises a hollow third cylindrical body having a plurality of parallel reflective surfaces longitudinally disposed about the inner lateral surface of said third body, said third body being concentrically disposed about said second body, each of said reflective surfaces being in substantially mutually exclusive optical alignment with a predetermined track and having a given configuration for reflecting said light beam normal to the lateral surfaces of said first and second bodies.

References Cited by the Examiner
UNITED STATES PATENTS
2,054,216   9/1936   Fuller _____ 84—1.28 X NEIL C. READ, Primary Examiner.

D. L. TRAFTON, Assistant Examiner.